United States Patent [19]

Kraus

[11] Patent Number: 4,998,642
[45] Date of Patent: Mar. 12, 1991

[54] PLASTIC SEALING COVER

[75] Inventor: Willibald Kraus, Grünstadt, Fed. Rep. of Germany

[73] Assignee: TRW United Carr BMBH & Co., Enkenbach-Alsenborn, Fed. Rep. of Germany

[21] Appl. No.: 401,227

[22] Filed: Aug. 31, 1989

[30] Foreign Application Priority Data

Sep. 15, 1988 [DE] Fed. Rep. of Germany ....... 3831433

[51] Int. Cl.⁵ ............................................. B65D 39/00
[52] U.S. Cl. ........................... 220/307; 220/DIG. 19
[58] Field of Search ....................... 220/307, DIG. 19

[56] References Cited

U.S. PATENT DOCUMENTS

| | | | |
|---|---|---|---|
| 3,133,666 | 5/1964 | Henehert | 220/307 |
| 4,243,152 | 1/1981 | Ignell | 220/307 X |
| 4,399,924 | 8/1983 | Nilsson | 220/307 X |
| 4,646,932 | 3/1987 | Masler | 220/307 |
| 4,784,285 | 11/1988 | Patel | 220/307 |
| 4,801,040 | 1/1989 | Kraus | 220/307 |

Primary Examiner—Stephen Marcus
Assistant Examiner—Nova Stucker
Attorney, Agent, or Firm—Fay, Sharpe, Beall, Fagan, Minnich & McKee

[57] ABSTRACT

A plastic closure cover especially for the sealing of an opening in a panel comprises a bottom part 2, against which adjoins a sealing lip 3 for lying against the upper side of the panel. A sealing catch ring 10 is positioned opposite the sealing lip 3 for lying against the under side of the panel. According to the invention, the catch ring 10 has two sealing surfaces, each of which lie tightly against the opposite surfaces of the panel in the area about the opening.

13 Claims, 2 Drawing Sheets

PLASTIC SEALING COVER

BACKGROUND OF THE INVENTION

The invention relates to a plastic sealing plug or cover especially intended for the closing and sealing of an opening in a panel member. The cover is of the type including a bottom part having an adjoining sealing lip adapted to lie against the upper side of the panel, and a sealing catch ring lying opposite the sealing lip and pressing against the under side of the panel. The panel member may be, for example, a motor vehicle body or frame part or a component of a household appliance.

As state of the art, a sealing cover of this general type is already known in which the catch ring cooperates in sealing only over a short contact distance with the under side of a panel (see, for example, West German Patent No. 3,446,151). Along with an insufficient sealing effect, there is given accordingly an insufficient automatic centering of this known sealing cover.

The present invention attacks, therefore, the problem of providing a sealing cover of the kind mentioned, in which, besides good centering there is assured, most importantly, the fullest possible sealing of the carrier opening.

This problem is solved, according to the invention, by the fact that the catch ring has two sealing surfaces which engage tightly against the opposed surfaces of the panel in the zone of the opening. This gives the advantage that the sealing cover seals over sealing surfaces of the panel on both sides of the panel opening. Thus, the cover, besides having a good centering, is absolutely watertight.

In a further development of the invention, the catch ring may have a circumferential protrusion and a sealing flange lying opposite this protrusion. Here, additionally, the zone of the catch ring between the surrounding protrusion and the sealing flange may be set to the diameter of the panel opening. This produces, advantageously, a triple sealing of the panel opening through the sealing cover according to the invention; namely, one seal from the upper side of the carrier opening, a second seal from the lower side of the panel opening, and a third seal in the zone of the end wall of the panel opening itself.

According to another feature of the invention, the sealing flange may consist of a horizontal portion and a further portion directed diagonally toward the panel opening, so that a good resilient sealing effect is assured.

In a further development of the invention, the sealing flange is arranged in the zone of the sealing lip, while the sealing lip covers the sealing flange and the protrusion of the catch ring.

According to another feature of the invention, the zone of the catch ring which is fitted to the carrier opening is arranged to strike against at least one edge of the carrier opening. In this way, there is produced a further improvement of the sealing effect. Preferably, the surrounding protrusion on the side opposite the sealing flange is designed with beveled surface located to strike against an edge of the panel opening to thus further improve the sealing effect.

In a further development of the invention, a diagonally remaining stay may join the catch ring to the bearing crown of the closing cover.

In a further development of the invention, it is also possible to produce the sealing cover, for example, as a composite from two or more materials. Here, a softer component can be used for the sealing of the panel, and a harder component can provide strength. The harder material of the bottom part may, for example, be provided with a basic configuration which is advantageous for fully automated installation. Various geometric figures in the form of stays may be placed in the basin.

As an alternative to the basin configuration in the zone of the bottom part, the latter may also be provided with a smooth closure wall.

The joining of the composite, plural component structure may take place in a multi-component injection molding process. As an alternative, it is also possible to join, for example, the bottom part and the catch ring together through several pins, knobs or protrusions, so that there is a mechanical connection between the two parts of the sealing cover according to the invention.

Through the special shaping of the sealing cover, it is also possible to place the latter in greatly deformed bores or in panels with collar holes. In this way, the sealing cover according to the invention, may be mounted from below. There is given, advantageously, a water-tightness and a protection against a stone blows from outside as well as sufficient strength from the inside to support walking loads.

The invention is described in detail below, from examples of preferred embodiments represented in the drawings wherein.

Figure 1:
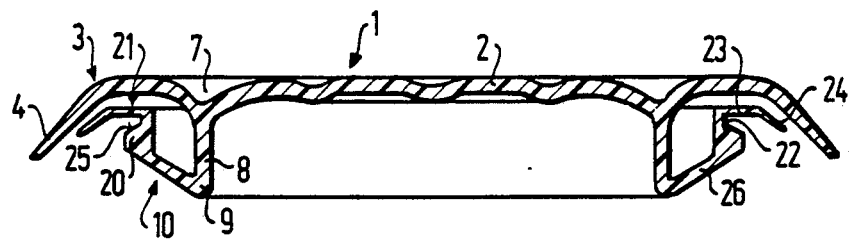
FIG. 1 is a cross section through a sealing cover formed in accordance with the invention.

Referring more particularly to the drawings wherein the showings are for the purpose of illustrating preferred embodiments only and not for the purpose of limiting the same, FIG. 1 illustrates the sealing cover 1 as generally comprising a bottom part or wall 2 and a surrounding, radially and axially extending sealing lip 3. Lip 3 has an outer free end or rim 4 or wall which decreases in thickness toward its radial outer end.

The bottom part 2 continues at a transition 7 to the sealing lip 3 and extends downward in one piece into a bearing crown 8. A catch ring 10 is carried by a continuous web 26 which joins to the lower end 9 of crown 8. This catch ring 10 has two sealing surfaces. These sealing surfaces are formed by a surrounding protrusion 20 and a sealing flange 21 which lies opposite the protrusion. Between this sealing flange 21 and the protrusion 20 is a zone 22 of the catch ring 10, which is sized to correspond generally to the diameter of a panel opening.

It appears further, from FIG. 1, that the sealing flange 21 consists of a horizontal zone or portion 23 and an adjoining diagonally extending free end portion 24. Preferably end portion 24 is directed somewhat axially toward a panel surface. This sealing flange 21 is arranged to lie in the zone of the sealing lip 3 such that the sealing lip 3 covers and overlies the sealing flange 21 and the protrusion 20 of the catch ring 10.

Figure 2:
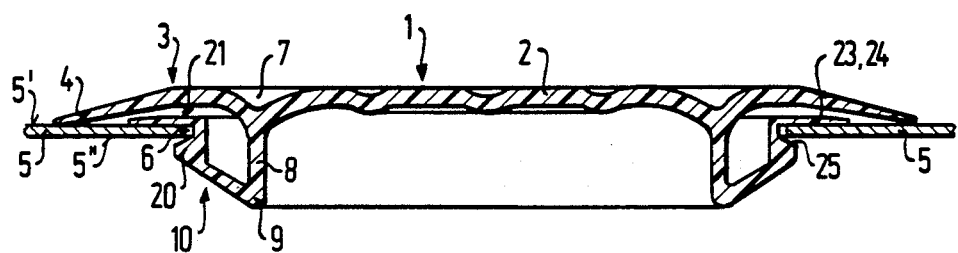
FIG. 2 shows the sealing cover of FIG. 1 in installed condition.

FIG. 2 shows the installed condition. As can be seen, the outer free end or rim 4 sealing cover in the sealing lip 3 presses against the surface 5' of a panel 5 in the zone circumferentially about a panel opening 6. Below this, the horizontal portion 23 and the diagonal portion 24 of the sealing flange 21 also press against a radially inner zone of the surface 5' of the panel 5.

The opposite surface 5" of the panel 5 is engaged with some pressure by a bevel 25 of the surrounding protrusion 20, so that, in all, the catch ring 10 has two sealing surfaces lying opposite each other and engaging tightly against the surfaces 5' and 5" of the carrier 5 in the area about the opening 6. Moreover, the portion 22 of the catch ring 10 is sized between the protrusion 20 and the sealing flange 21 to fit the diameter of the carrier opening 6 so that, in all, a triple sealing is given in the opening 6 of the carrier 5. Since the catch ring 10 is connected through a stay or web 26 with the lower zone 9 of the bearing crown 8 of the sealing cover 1, there is given, as a result of a spring action, an easy and simple mounting of the sealing cover according to the invention in the opening 6 of the panel 5. Here, the surrounding sealing lip 3, by its outer rim 4, completely covers the sealing flange 21, so that the sealing cover according to the invention is water-tight.

Figure 3:
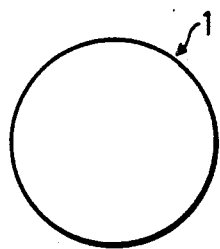
FIGS. 3 to 5 are top views showing different shapes for sealing covers according to the invention.
Figure 4:
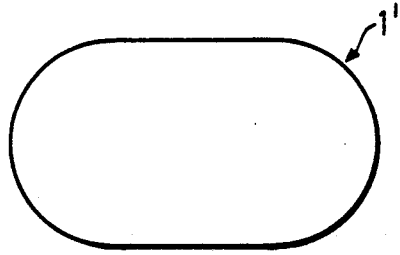
Figure 5:
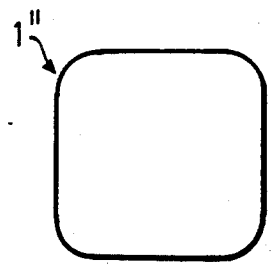

FIGS. 3, 4 and 5 show, in top view, how the outer circumference 1, 1', and 1" of sealing covers, according to the invention, can be shaped. The outer circumference of the sealing lip 3, the bearing crown 8 and the sealing flange 21, as well as the protrusion 20, may be circular, as shown in FIG. 3, elongated as shown in FIG. 4, or rectangular as shown in FIG. 5. In ways not shown in detail, the sealing cover might also be oval or have other geometric forms. Also, for example, the sealing cover 1, 1', 1" may be made, for example, of a soft elastic material.

Through the special shaping of the catch ring, there is assured, in a simple way, rapid and power-saving mounting and a water-tight sealing of the opening 6 of panel 5.

Figure 6:
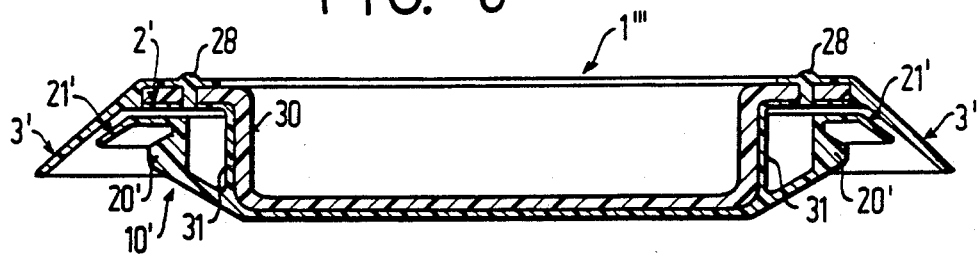
FIG. 6 is a cross section through another form of the invention.

FIG. 6 represents another embodiment of the invention. Here, the sealing cover 1''' is made from a two-component material. The bottom part 2' is made of a harder plastic material and the sealing ring 3', as well as the catch ring 10' with protrusion 20' and sealing flange 21', of a softer plastic material. The harder material of the bottom part 2' is used for strength, while the softer component used in the sealing flange 21' and the sealing ring 3' is provided for the sealing of the carrier 6.

As can be seen also from FIG. 6, the bottom part may have a depressed center in the form of a basin 30, so that a kind of cup form is given. The joining of the softer plastic material with the harder plastic material may take place in a manner known per se, as by a two-component injection molding process.

Figure 7:
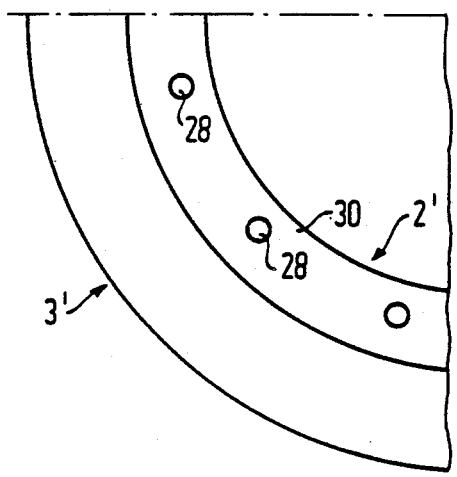
FIGS. 7 and 8 are partial plan views of two different embodiments possibilities of execution of the sealing covers according to the invention.

It is also possible, as shown in FIG. 6, for example, that the catch ring 10' may be provided with an intermediate flange 31, which runs parallel to the outer wall of the basin 30 and the bottom part 2'. On the upper zone of the intermediate flange 31 are arranged according to FIGS. 7 and 8, spaced knobs 28 which engage through openings (not shown in detail) of the bottom part 2'. The knobs 28 have a head form and produce a form-fitting and force-fitting connection between the bottom part 2' and the catch ring 10'.

Figure 8:
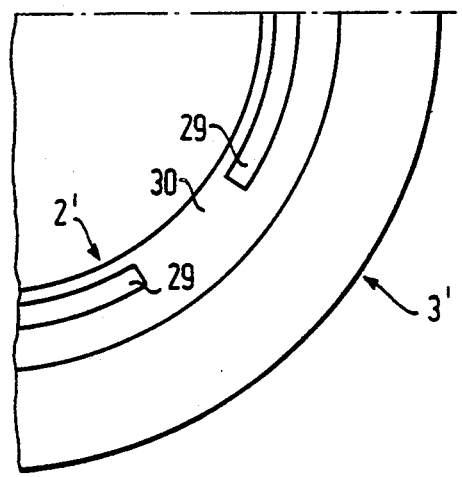

In FIG. 8 is shown another possibility of execution of the connection between the bottom part 2' and the catch ring 10'. In this form the intermediate flange 31 has on the upper side, instead of the knobs 28, a protrusion 29 which is divided into parts corresponding to the counter-openings on the upper side of the bottom part 2'. Again, a form and force-fitting connection is produced between the bottom part 2' and the catch ring 10'.

Figure 9:
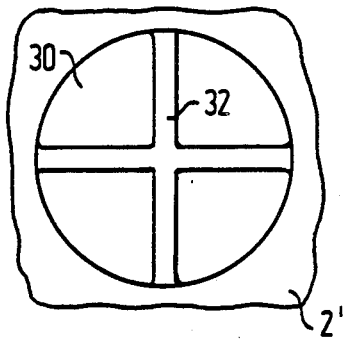
FIGS. 9 to 11 are top plan views of three different possibilities of the design of the stays.
Figure 10:
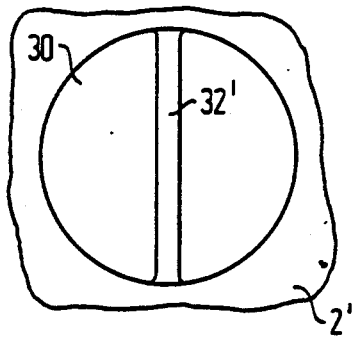
Figure 11:
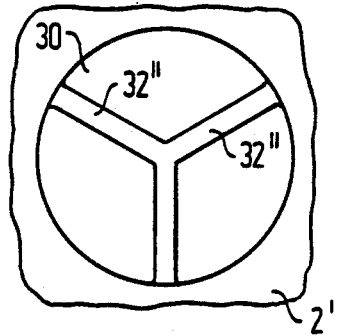

According to FIGS. 9, 10 or 11, the basin 30 may be provided with different reinforcing ribs or stays, 32, 32' or 32", through which it is possible to introduce or install the whole assembly through use of a fully-automatic mounting device (not shown) into a corresponding opening of a panel. According to FIG. 9, the stay 32 is in cross form. According to Figure 10, the stay 32' is an element running in a straight line, while according to FIG. 11, the stay 32" is Y-shaped.

It is also possible, instead of basin form 30, to provide the bottom part 2', similar to the forms of execution in Figures 1 and 2, with an upper cover. And further, the connection between the bottom part and the catch ring as mentioned before, can take place in the two-component injection molding process or as in the form according to FIG. 6, through mechanical elements, such as the knobs 28 or protrusions 29.

Figure 12:
FIGS. 12 and 13 are cross-sectional views showing two different shapes of the panel openings.
Figure 13:
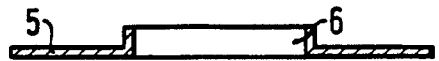

FIGS. 12 and 13 show two different possibilities of shaping the panel 5. According to FIG. 12, a flat panel is used as shown in FIG. 2; that is, this panel 5 has a flat opening 6. According to FIG. 13, the panel 5 is provided with a collar or flanged hole 6'. In all, the possibility exists of introducing the sealing cover into the panel in either direction by which a cleanly sealed-off opening is produced.

The sealing cover according to the invention may be advantageously fastened from above or from below on a panel 5, while water-tightness is given by the cooperation of the sealing ring 3 or 3' with the catch ring 10 or 10'. There is also given a protection from stone blows from outside, especially when the bottom part 2' consists of a harder plastic material. This also allows the closing cover to have sufficient strength to allow it to be walked on or function as a floor element. The intermediate flange 31 according to FIG. 6 may also cover the under side of the basin 30, so that the bottom part 2' and the basin 30 are imbedded in or enclosed as a whole by the intermediate flange 31. The protrusion 29 may also be designed continuous, while, by the two-component injection molding process, a good connection is provided between the bottom part 2' and the catch ring 3'.

What is claimed is:

1. A plastic closure member for sealing insertion in an opening in a panel having first and second opposed faces, said closure member comprising:
   a bottom element having a peripheral sealing lip joined thereto and adapted to sealingly engage the first face of the panel circumferentially about said opening;
   a sealing catch ring assembly carried by the bottom element at a location axially spaced from the sealing lip, the sealing catch ring assembly adapted to retain the closure member in the panel opening and including first and second circumferentially continuous sealing surfaces for respectively engaging the first and second opposed faces of the panel circumferentially of the panel opening, said circumferentially continuous sealing surfaces being respectively defined by a circumferential protrusion and an axially spaced sealing flange;

said sealing flange comprising a first portion which extends radially and a second portion which is inclined axially; and, said catch ring assembly joining to the bottom element through a web-like stay member which extends diagonally outward in a generally radial direction from a crown member that extends axially from the bottom element.

2. A plastic closure member as defined in claim 1 wherein the catch ring assembly includes a connecting portion between said first and second sealing surfaces, said connecting portion sized to be closely received in the panel opening.

3. A plastic closure member as defined in claim 1 wherein the sealing flange is adapted to engage the first face of the panel radially inwardly of the peripheral sealing lip.

4. A plastic closure member as defined in claim 2 wherein the connecting portion is sized to engage at least one edge of the panel opening.

5. A plastic closure member as defined in claim 1 wherein the circumferential protrusion has a beveled surface facing the sealing flange.

6. A plastic closure member as defined in claim 1 wherein the peripheral protrusion and the sealing flange are concentric.

7. A plastic closure member as defined in claim 1 wherein the closure member is formed as a composite of plastics of differing hardness.

8. A plastic closure member as defined in claim 7 wherein bottom element is formed of a first plastic and the sealing catch ring assembly are formed of a second softer plastic.

9. A plastic closure member as defined in claim 7 wherein the plastics of differing hardness are joined by a two component injection molding process.

10. A plastic closure member as defined in claim 7 wherein the bottom element and the catch ring assembly are joined by cooperating surface portions.

11. A plastic closure member as defined in claim 10 wherein said bottom element is in the form of a basin and wherein some of the cooperating surface portions are carried on an intermediate flange which extends parallel to the bottom element.

12. A plastic closure member as defined in claim 11 wherein at least one reinforcing stay is formed in said bottom element.

13. A plastic closure member for sealing insertion in an opening in a panel having first and second opposed faces, said closure member being formed as a composite of plastics of differing hardness and comprising:

a bottom element having a peripheral sealing lip adjoined thereto and adapted to sealingly engage the first face of the panel circumferentially about said opening;

a sealing catch ring assembly carried by the bottom element at a location axially spaced from the sealing lip, the sealing catch ring assembly adapted to retain the closure member in the panel opening and including first and second circumferentially continuous sealing surfaces for respectively engaging the first and second opposed faces of the panel circumferentially of the panel opening;

said bottom element being in the form of a basin and the bottom element and the catch ring assembly being joined by cooperating surface portions with some of the cooperating surface portions being carried on an intermediate flange which extends parallel to the bottom elements; and, at least one reinforcing stay formed in said bottom element.

* * * * *